United States Patent [19]
Brummel

[11] Patent Number: 5,301,859
[45] Date of Patent: Apr. 12, 1994

[54] FISH STRINGER

[76] Inventor: Ralph A. Brummel, 426 N. Lake St., Aurora, Ill. 60506

[21] Appl. No.: 418

[22] Filed: Jan. 4, 1993

[51] Int. Cl.$^5$ .............................................. A01K 65/00
[52] U.S. Cl. ........................................ 224/103; 43/55
[58] Field of Search ................... 43/54.1, 55; 224/103

[56] References Cited

U.S. PATENT DOCUMENTS

| | | | |
|---|---|---|---|
| 878,626 | 2/1908 | Guilford | 224/103 |
| 2,800,263 | 7/1957 | Hunt | 224/103 |
| 3,482,747 | 12/1969 | Jones | 224/103 |
| 3,540,637 | 11/1970 | Ezell | 224/103 |
| 4,830,244 | 5/1989 | Brannon | 224/103 |
| 4,976,382 | 12/1990 | Carpenter | 224/103 |
| 5,078,310 | 1/1992 | Ferry | 224/103 |

FOREIGN PATENT DOCUMENTS

2043426  3/1992  Canada ............................... 224/103

Primary Examiner—Kurt C. Rowan
Attorney, Agent, or Firm—Douglas L. Tschida

[57] ABSTRACT

A twist free fish stringer having a removeable end stop. A flexible length of cording includes a crimp coupled threading needle, a crimp coupled swivel assembly and one or more bored stop sleeves. A flanged end stop includes a spacer portion and through bore and is slidably retained along the cord to a selected stop sleeve via a hairpin clip which is tethered to the end stop. Alternative end stops and belt or wader mounted stringer retainers are also disclosed.

14 Claims, 7 Drawing Sheets

FISH STRINGER

BACKGROUND OF THE INVENTION

The present invention relates to a fish stringer and, in particular, to a tangle free cord-type stringer including a removeable end stop and a wader or belt mounted stringer retainer.

Numerous varieties of captured fish retainers have been developed over the years. Some of the most rudimentary comprise a branch or other piece of sturdy vegetation which is threaded through the gills or lips of one or more fish to retain the fish along the branch. One or more of the side branches can be trimmed to provide an end stop to prevent the fish from sliding off the main stem. A short length of rope may also be substituted for a willow branch.

A mainstay stringer construction comprises a length of cording, such as rope, which includes a rigid threading needle that is attached to one end and a looped eyelet that is secured to an opposite end. With the mounting of a first fish to the stringer and the looping of the cord through the eyelet, the first fish secured to the stringer becomes an end stop. Subsequent fish are merely attached via a threading of the needle through the gills or lips of the fish.

Two principal shortcomings of the above stringer arise during use from a tangling or twisting of the cord member as the fish trail from either the fisherman or a boat. That is, ones of the live fish may swim about or normal movements of the fisherman or currents can induce a twisting or tangling of the cord member which can aggravate the fisherman adding additional fish to the stringer or when unstringing the fish.

A further shortcoming in that upon release of the fish from the stringer, it is necessary to reverse the stringing process to sequentially release each of the retained fish. Once the last fish is reached, the stringer must be released from the eyelet. The latter process can be time consuming. Due to the necessity of handling of each of the fish, the fisherman may also sustain injury from the gill plates and pointed fins of the fish, especially if the cord has become twisted.

Preferably, therefore a stringer is desired having a construction which is twist-free and non-snarling and which releases any strong fish without separate handling. Ideally the fish should be releasable with a simple jerk, upon releasing an end stop.

Varieties of improvements have been made to the basic cord stringer over the years. Some assemblies provide a number of slide mounted retainers which mount along the cording and which separately secure individual fish, one example is shown at U.S. Pat. No. 3,893,605. The retainers of the latter reference are able to separately rotate about the cording member. Other retainers are known which include swivels with each retainer. Fish removal, however, still requires a separate handling of each fish.

Varieties of brackets have also been developed for use with cord stringers. Such brackets may mount to the fisherman, such as along a belt, to a boat or to a ground stake, depending upon the fishing circumstance. Various of these devices are disclosed in U.S. Pat. Nos. 3,332,121; 4,570,836; 4,830,244; 4,960,231; 5,025,587; and 5,078,310.

Other cord stringer constructions which exhibit improved end stops are disclosed at U.S. Pat. Nos. 3,371,830; 3,540,637; and 4,976,382. The U.S. Pat. Nos. 3,371,830 and 3,540,673 particularly provide stringers which include adjustable or re-positionable end stops of differing degrees of sophistication.

None of the foregoing stringers provide a twist-free cord or a low cost end stop which is easily adjusted during fishing and which may be easily removed, prior to fish cleaning, to release the fish from the stringer. Nor do any stringers include a swivel integrated into the cording member.

SUMMARY OF THE INVENTION

It is accordingly a primary of the object of the present invention to provide an improved cord-type stringer which includes means for preventing cord twisting and entanglement.

It is a further object of the invention to provide a cord stringer having an adjustable end stop which is also removeable.

It is a further object of the invention to provide a cord stringer which includes one or more end stop mounting positions, which mounting positions receive a transversely mounted fastener for limiting passage of a flanged retainer and strung fish.

It is a further object of the invention to provide a flanged end stop having a spacer segment and means for tethering the fastener to the stringer.

It is a further object of the invention to provide a cord member including an in-line swivel assembly.

Various of the foregoing objects, advantages and distinctions of the invention are obtained in a presently preferred construction which includes a cord member having a threading needle secured to one end and a flanged, removeable end stop which is selectively securable along the cord. One or more end-stop receiving sections are crimp mounted to the cord. Each section includes a transverse bore which receives a "hairpin clip" fastener. A tether secures the fastener to a flanged end stop.

Alternative end stop assemblies are also disclosed. Each end stop provides a bored sleeve which either includes annular flanges of relatively large diameter or a winged flange. Alternative chain and bead tethers secure the clip fastener to the end stops.

Secured adjacent to a fore-end of the cord is a permanently mounted swivel assembly. In one construction, a bead chain mates with a pair of bead retainers which are crimped to the cord.

Also disclosed are alternative stringer retainers which may be worn by the fisherman. Each retainer includes a clip that mounts to a boat, a belt or a pair of waders and retains the stringer to protect the fisherman from injury and prevent loss of the stringer.

Still other objects, advantages and distinctions of the invention are described in detail with respect to the appended drawings. To the extent various modifications and improvements have been considered, they are described as appropriate. The descriptions should not be strictly construed nor interpreted in limitation of the spirit and scope of the invention. Rather, the invention should be interpreted within the scope of the following appended claims.

DESCRIPTION OF THE PREFERRED EMBODIMENT

Figure 1:
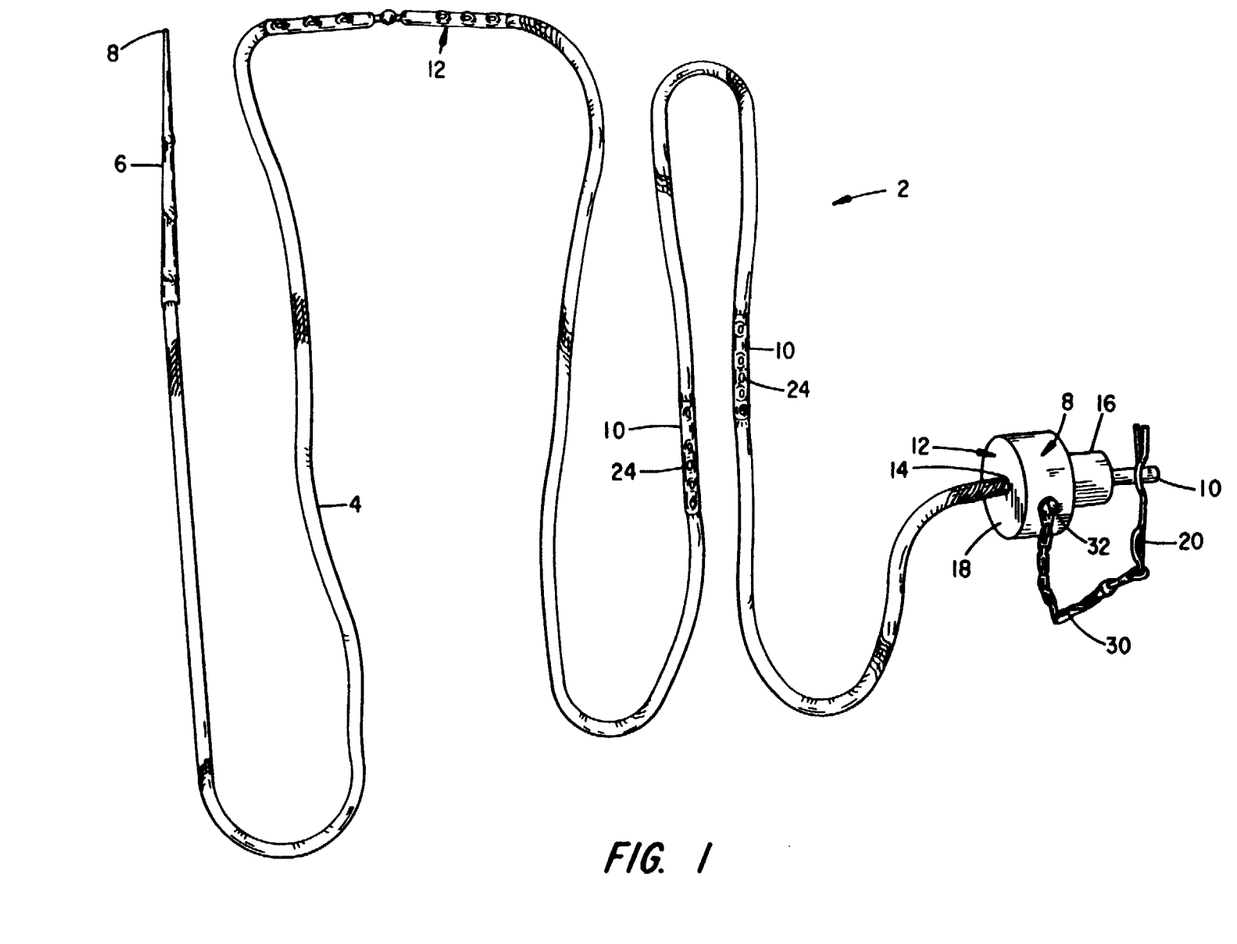
FIG. 1 is an isometric drawing of the presently improved stringer.

Referring to FIG. 1., a perspective drawing is shown of the improved fish stringer 2. The stringer 2 is comprised of a braided cord 4 which can be cut to any desired length, most typically a length in the range of three to four feet is preferred. Secured to one end of the cord is a threading needle 6.

The needle 6 is typically constructed of a formed brass or other non-corroding metal or plastic and is crimped or otherwise secured to the cord 4. The needle 6 provides a sharp point 8 to penetrate the relatively tough skin and cartilage found within most fish.

Mounted to an opposite end of the cord 4 is an improved end stop assembly 8. The end stop assembly 8 cooperates with a number of stop sleeves 10 that are secured along the length of the cord 4. Also mounted along the cord is a swivel assembly 12. More of the details of the end stop assembly 8, stop sleeves 10 and swivel assembly are described below.

The cord 4 may be constructed from any variety of materials. Preferably any selected material is tolerant of repeated exposures to water, abrasion and ultra violet light to prevent premature wear to the stringer 2. A variety of braided nylon and polyvinyl cording materials adequately serve this end and may be readily attached to the appurtenant assemblies affixed to the cording 4.

Figure 2:
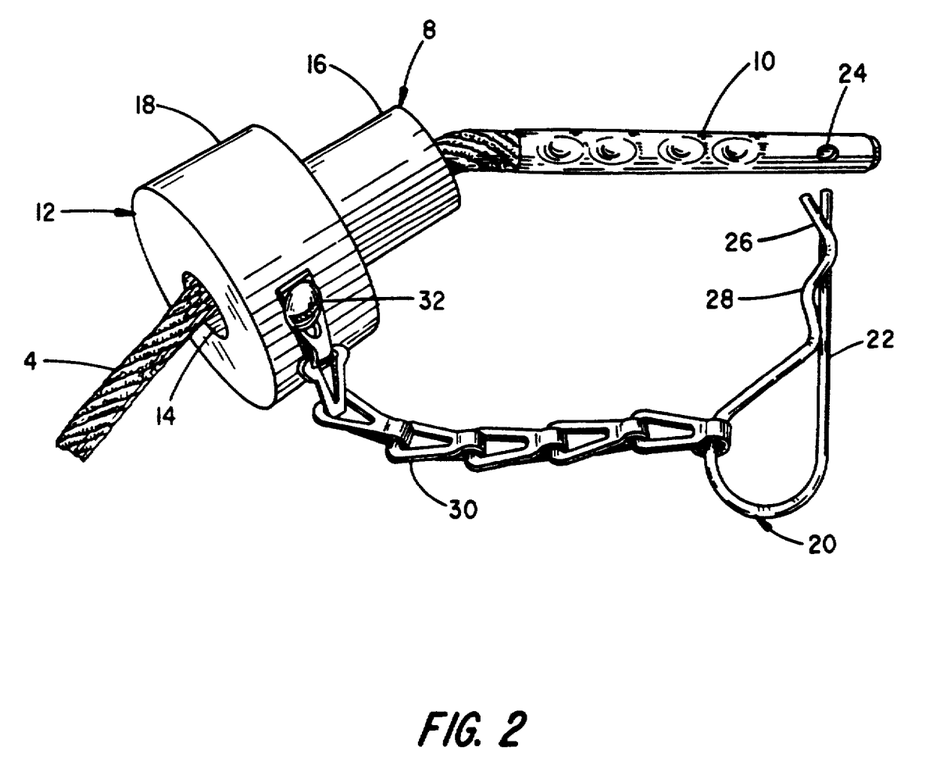
FIG. 2 is an isometric drawing of the removeable and adjustable end stop assembly.

With attention also directed to FIG. 2, a detailed drawing is shown of the presently preferred end stop assembly 8. The assembly 8 includes a flanged slide or stop member 12 which has a bore 14 and which is mounted along the cord 4. The body of the stop 12 provides a pair of contiguous cylindrical segments or flange portions 16 and 18 which exhibit successively increasing radiuses. The radius of the first or smaller diameter portion 16 is sized to provide access to a fastener 20, especially if the stop is caught in the gills of the end fish. The radius of the second or larger diameter portion 18 prevents withdrawal through the gills.

Tethered to the stop 12 is the clip fastener 20 which exhibits a so-called "hair clip" configuration. The fastener 20 mounts to the cord 4 to prevent the end stop 8 from sliding off the cord 4. The fastener 20 is constructed of spring steel and includes a body portion 22 which mounts through a bore 24 in a selected stop sleeve 10. The bore 24 is preferably centered in the sleeve 10. An adjoining portion 26 includes a region of arcuate relief 28 which mounts about the stop sleeve 10 when the fastener 20 is fastened thereto. Although the foregoing clip fastener 20 is preferred, varieties of other fasteners can be substituted to prevent passage of the stop 12, while retaining the clip 20 to the sleeve 10.

A length of chain or tether 30 tethers the clip fastener 20 to the stop 12 and prevents possible loss of the clip 20 while fishing. The tether 30 is secured to the stop 12 via a rivet or screw fastener 32. It is to be appreciated a variety of alternative tethers may be used, just as a variety of other stop configurations may also be used to advantage with the present stringer 2.

Figure 3:
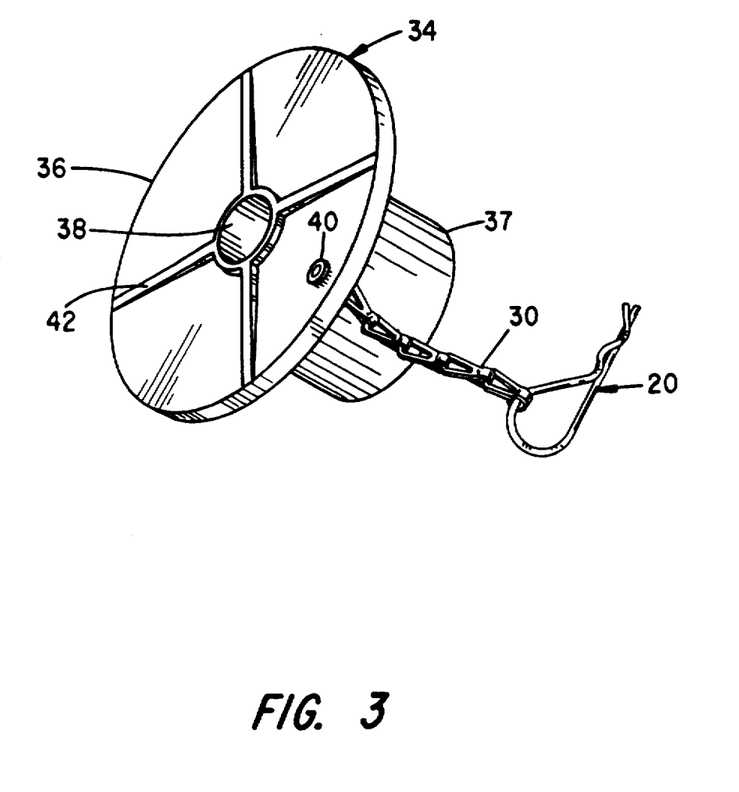
FIG. 3 is an isometric drawing of an alternative end stop assembly.

In the latter regard, attention is directed to FIG. 3 which shows an alternatively configured end stop assembly 34. The assembly 34 provides a disk-like flange 36 which includes a central bore 38. A smaller diameter spacer 37 extends from the flange 36. A tether chain 30 is secured to the body of the flange with a rivet fastener 40. Secured to the opposite end of the tether is a clip fastener 40. The flanges 36 and 37 are constructed as a unitary assembly from an injection molded plastic and includes a plurality of ribbed stiffeners 42 which strengthen the flange 36, yet permit the reduction of molding material.

Figure 4:
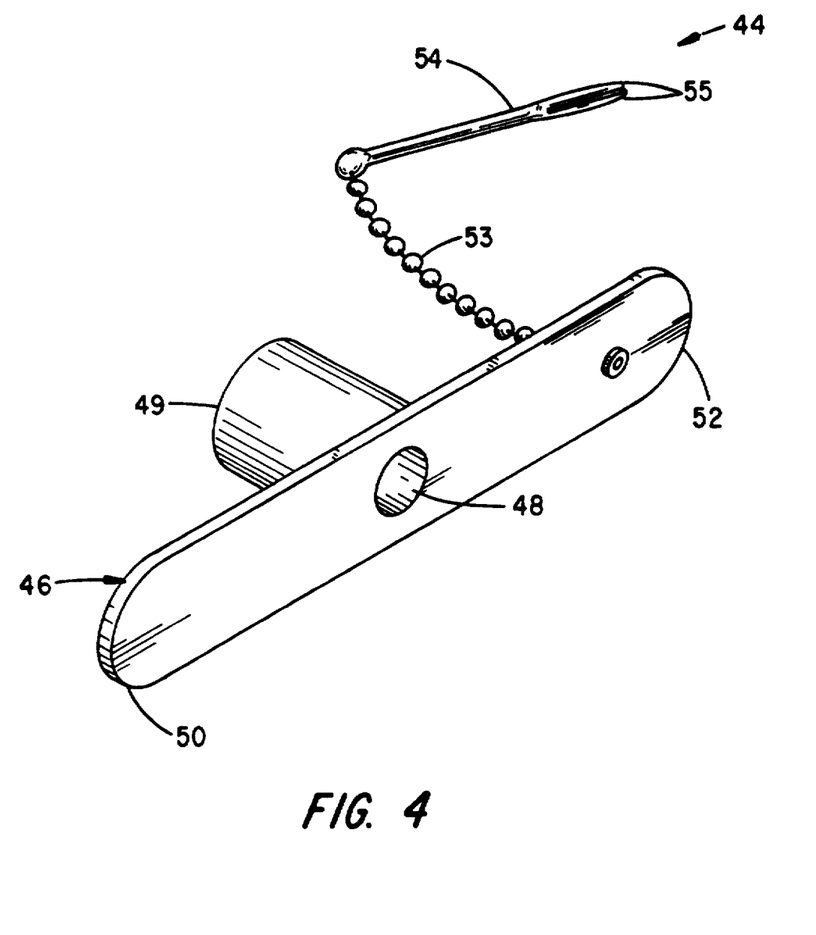
FIG. 4 is an isometric drawing of an alternative winged end stop assembly.

FIG. 4 discloses still another end stop construction 44, which is molded from a plastic. In lieu of a circular flange, a winged stop 46 is provided which includes a central bore 48 that extends through a trailing spacer 49 and a pair of adjoining wings 50 and 52 which radiate from the bore 48.

Secured to the stop 46 is a beaded tether 53 and attached to the opposite end of the tether is a split pin fastener 54 such as a "cotter pin". The tether 53 and the fastener 54 can be the same materials. The split ends 55 of the fastener 54 are pliable and permit repeated bending to retain the fastener 54 to a selected sleeve 10. Any selected fastener, preferably includes means for retaining the fastener 54 to the stop sleeve 10, once mounted.

Returning attention to FIG. 1 and with additional attention to FIG. 2, a number of stop sleeves 10 are provided along the length of the cord 4. The spacing between the sleeves 10 can be established as desired. Each of the sleeves 10 generally comprises a length of split-brass material which is crimp coupled to the cording member 4 with the aid of an appropriate crimping tool. Each sleeve 10 is separately bored to provide an aperture 24 for receiving the clip fastener 20. The stop 12 may thus be positioned at a variety of locations along the length of the cord 4. The position can be selected depending upon the number of fish contained on the stringer 2 or the fishing conditions. During wading conditions, multiple stop locations are preferred to minimize the length of the stringer trailing behind the fisherman and space between the fish and fisherman and thereby prevent snagging or twisting.

Figure 5:
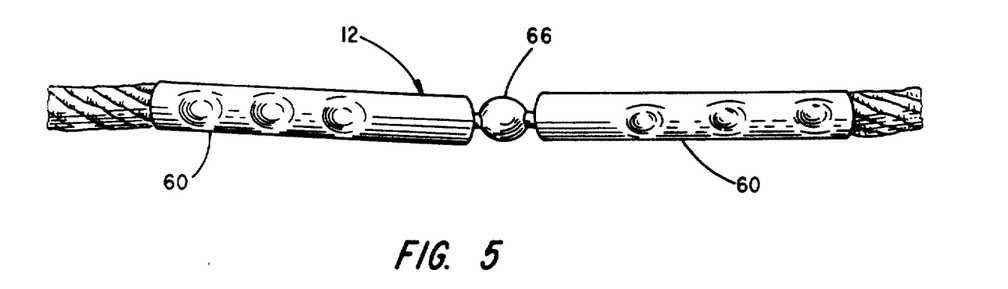
FIG. 5 is an isometric drawing of the swivel assembly.
Figure 6:
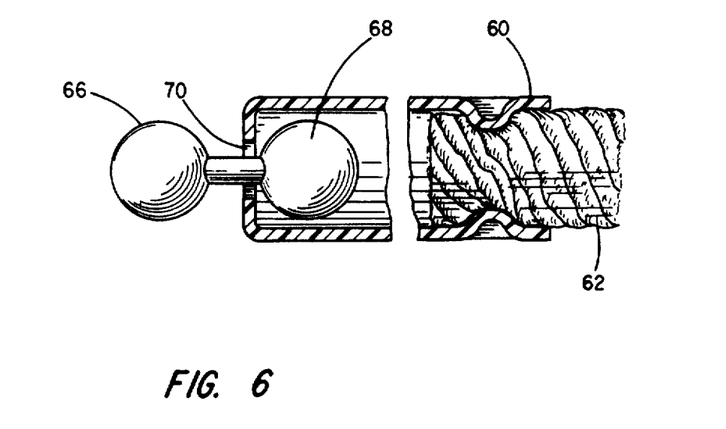
FIG. 6 is a detailed cross section drawing of a portion of the swivel assembly.

In the latter regard and with attention also directed to FIGS. 5 and 6, detailed views are provided to the swivel assembly 12. The swivel assembly 12 is constructed of a pair of sleeves 60 which are crimp coupled to severed ends 62 of the cord 4. Joining the sleeves 60 together is a length of beaded chain 66. Individual beads 68 are restrained within the sleeve ends 60. An aperture 70 of each sleeve end 60 is sized to permit independent rotation of the captured beads 68 and joined lengths of cording. With the stringing of fish to the stringer 2 and the placement of the end stop 8 such that the fish are suspended aft of the swivel assembly 12, should any of the restrained fish roll or otherwise twist in the water, the twisting action is not imparted to the cording 4. Instead, the cording section which contains the fish also rotates, independent of the portion secured to the fisherman. A twist-free stringer is thus obtained which is especially desirable for use with fish species, such as bullheads, catfish, northerns or like species.

Figure 7:
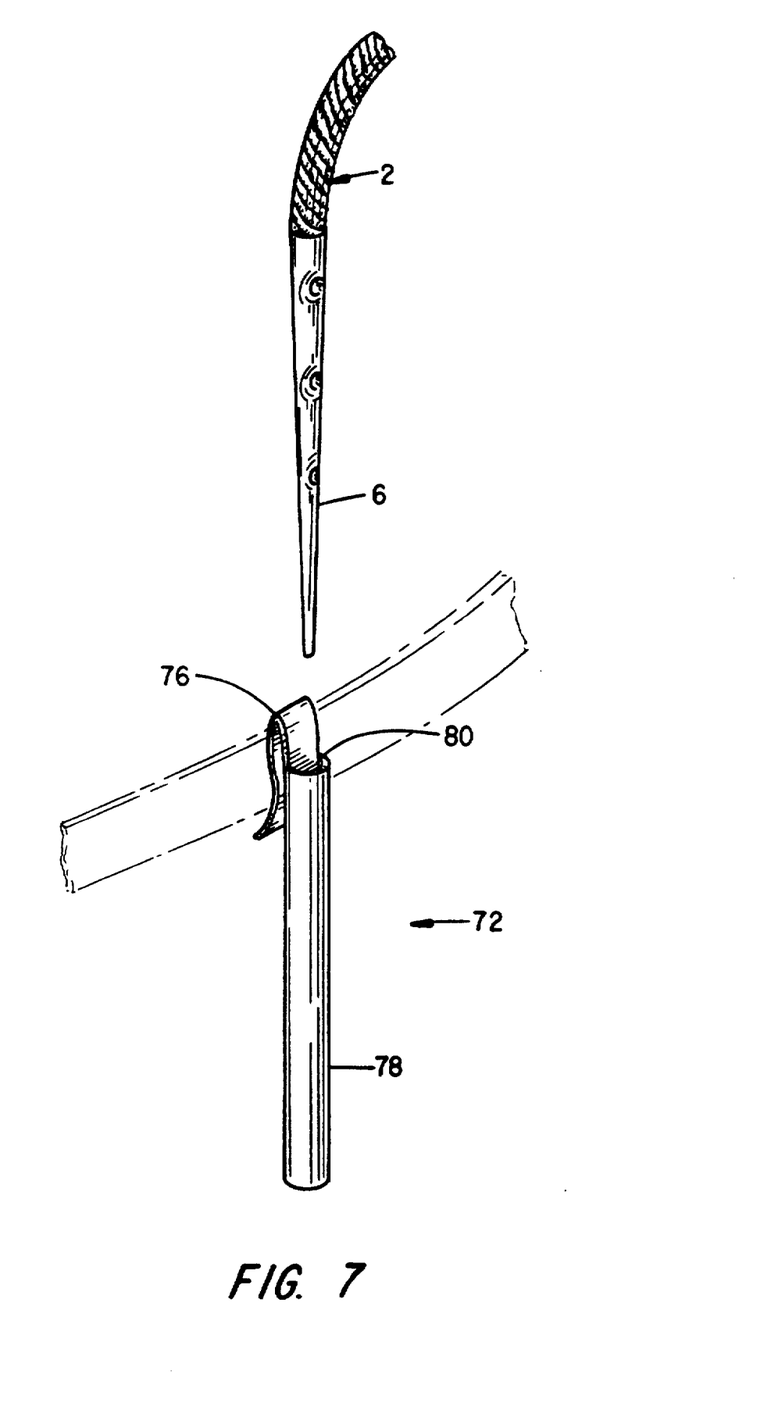
FIG. 7 is an isometric drawing of a belt mounted stringer retainer.
Figure 8:
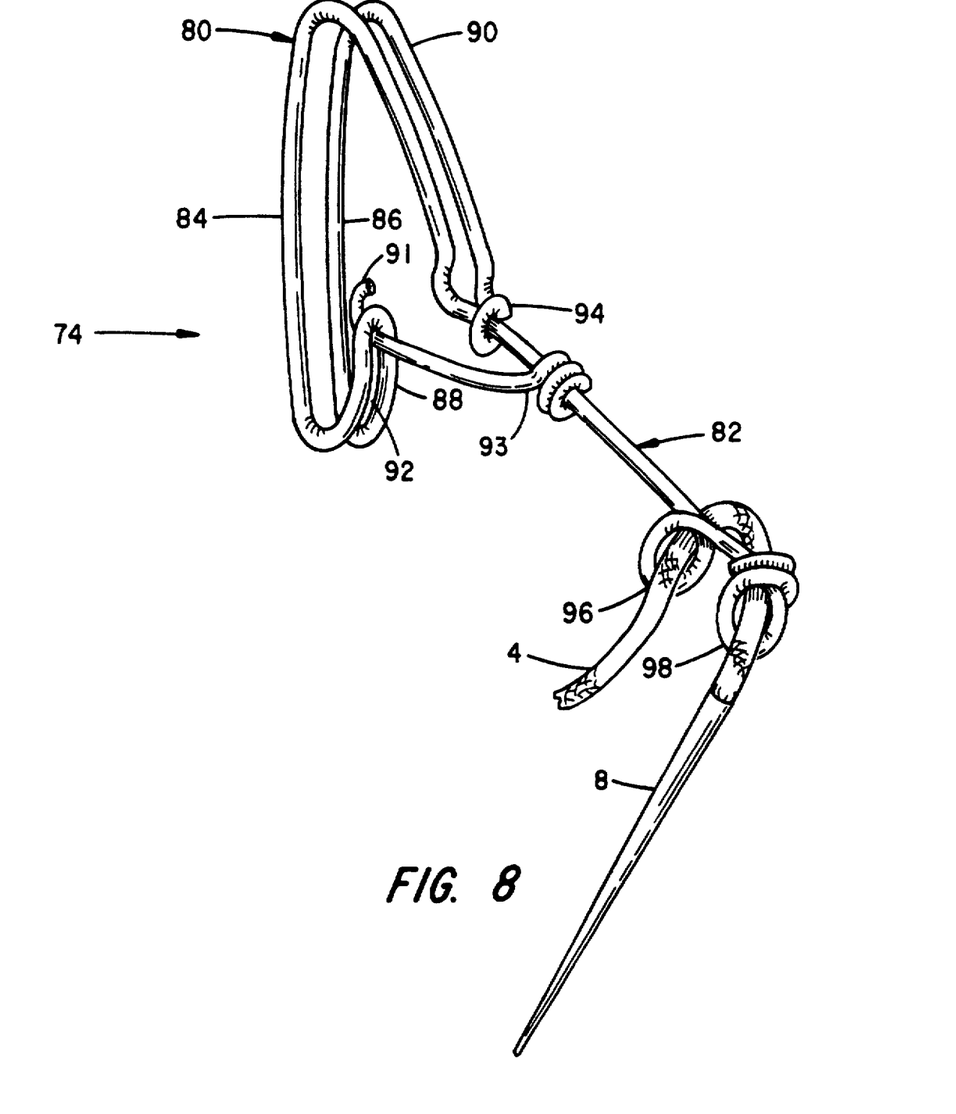
FIG. 8 is an isometric drawing of a wire form stringer retainer.

Appreciating the potential use of the stringer 2 by wading fisherman, attention is directed to FIGS. 7 and 8 which show clip retainers 72 and 74 that find advantage for securing the stringer 2 to the fisherman, yet prevent the inadvertent release of the stringer from the fisherman. FIG. 7 shows one type of retainer 72 which includes a resilient spring clip 76 which mounts to the chest band of a pair of waders or belt (shown in dashed line) and from which depends a tubular body or sheath 78 which surrounds a longitudinal cavity 80. The cavity 80 is sized to accept the threading needle 6. Preferably the cavity 80 is sized to prevent inadvertent withdrawal of the threading needle 6 during normal fishing conditions. The clip 76 and body 78 may be molded as an integral assembly or may be constructed as a composite assembly.

FIG. 8 depicts yet another stringer retainer 74 which is constructed of a formed wire. The retainer 74 includes a belt clip portion 80 and a stringer tie-off portion 82. The belt portion 80 comprises a pair of parallel arms 84, 86 which are formed to exhibit a C-shape when viewed in plan elevation. A minor leg portion 88 projects upward from the lower end of the clip and a major portion 90 depends downward from an upper end to approximately the center of the clip 80.

A separation or opening 92 is provided at the end of the leg portion 88 between the adjacent arms 84, 86, to receive a curved end 91 of a latch clip 93 which mounts through the opening 92. A loop 94 is also formed in the end of the arm 86, and defines the end of the clip portion 80. Once the clip portion 80 is positioned over a belt, the latch 93 is positioned at the aperture 92. The stringer 2 is thus securely restrained to the belt of a fisherman or any other structure about which the clip portion 80 is mounted.

The tie-off portion 82, otherwise, includes a pair of loops 96, 98 at an opposite end. Each of the loops spiral and extend 360 degrees. The endmost loop 98 is twisted to provide a complete circle. The diameter of the loop 98 can be sized as desired. That is, the loop 98 can be sized to retain the needle 6. Alternatively, the diameter of the loop 98 can be increased to permit the needle 6 to dangle from the retainer portion 82.

During normal use, the threading needle is inserted first through the loop 96 and then back through the end loop 98. As mounted, the threading needle 6 projects away from the fisherman to prevent possible injury. The needle 6 may also be readily removed from the retainer 74 by merely pushing the needle 8 back through the loop 98 and then pulling the cord 4 through the loop 96.

While the invention has been described with reference to various presently preferred constructions and considered modifications and improvements thereto, it is to be appreciated still other constructions may be suggested to those skilled in the art. The following claims should accordingly be interpreted to include all those equivalent embodiments within the spirit and scope thereof.

What is claimed is:

1. A fish stringer including:
   (a) a cord having first and second portions and swivel means for coupling said first and second portions to one another and allowing said second portion to rotate independent of said first portion;
   (b) a threading needle secured to said first portion;
   (c) a stop sleeve secured to said second portion and having a through bore;
   (d) a flanged member having a through bore and through which bore said cord slidably mounts;
   (e) restraint means mounting to said stop sleeve for limiting movement of said flanged member along said cord; and
   (f) means for tethering said restraint means to said flanged member.

2. Apparatus as set forth in claim 1 wherein said restraint means comprises a body which mounts through the bore of said stop sleeve and means for retaining said body to said stop sleeve.

3. Apparatus as set forth in claim 1 wherein said cord includes a plurality of stop sleeves, wherein each stop sleeve is crimped to said second portion in displaced relation to an adjacent stop sleeve.

4. Apparatus as set forth in claim 1 wherein said tether means comprises a length of chain.

5. Apparatus as set forth in claim 1 wherein said restraint means comprises a fastener having a linear body portion which mounts through said bore and a nonlinear portion which resiliently flexes to straddle said stop sleeve upon mounting said fastener to said stop sleeve.

6. Apparatus as set forth in claim 1 wherein said flanged member includes first and second annular portions of differing diameters.

7. Apparatus as set forth in claim 1 wherein said flanged member includes first and second planar portions which radially project from an annular body and further including a beaded tether which secures said fastener to said flanged member.

8. Apparatus as set forth in claim 1 including retainer means for retaining said stringer to a fisherperson comprising means for securing said retainer means to said fisherperson and means for capturing said cord.

9. Apparatus as set forth in claim 8 wherein said retainer means comprises a resilient clip and a sheath which depends from said clip for receiving said threading needle.

10. Apparatus as set forth in claim 8 wherein said securing means comprises a body which includes a leg and wherein said leg includes at least one aperture through which said cord passes upon securing the stringer to the fisherperson.

11. Apparatus as set forth in claim 8 wherein said body includes a second leg and latch means for mating with the second leg, whereby said body is secured to the fisherperson.

12. A fish stringer including:
   (a) a cord having first and second portions and swivel means for coupling said first and second portions to one another and allowing said second portion to rotate independent of said first portion;
   (b) a threading needle secured to said first portion;
   (c) a plurality of stop sleeves secured to said second portion and wherein each stop sleeve includes a through bore;
   (d) a flanged member having a longitudinal bore and through which bore said cord slidably mounts;
   (e) a fastener having a linear body portion which mounts through the bore of said stop sleeve and a nonlinear portion which resiliently flexes to straddle said stop sleeve upon mounting said fastener to said stop sleeve; and
   (f) means for tethering said fastener to said flanged member.

13. A fish stringer including:
   (a) a cord having first and second portions;

(b) swivel means including first and second sleeves respectively mounted about said first and second portions and bearing means mounted between said first and second sleeves for permitting the first and second cord portions to rotate independent of each other;

(c) a threading needle secured to said first portion;

(d) a stop sleeve secured to the second cord portion and having a through bore; and (e) restraint means including a flanged member having a bore and which slidably receives said cord and a fastener which mounts through the bore of said stop sleeve for limiting movement of said flanged member along said cord.

14. Apparatus as set forth in claim 12 including means for tethering said fastener to said flanged member.

* * * * *